Figure 3:
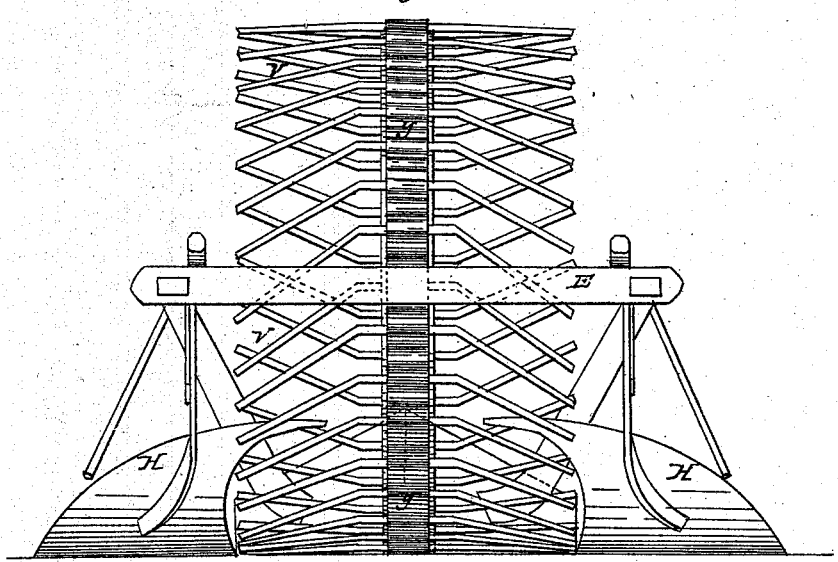

M. JOHNSON.
Potato Digger.
No. 103,194.
2 Sheets—Sheet 1.
Patented May 17, 1870.
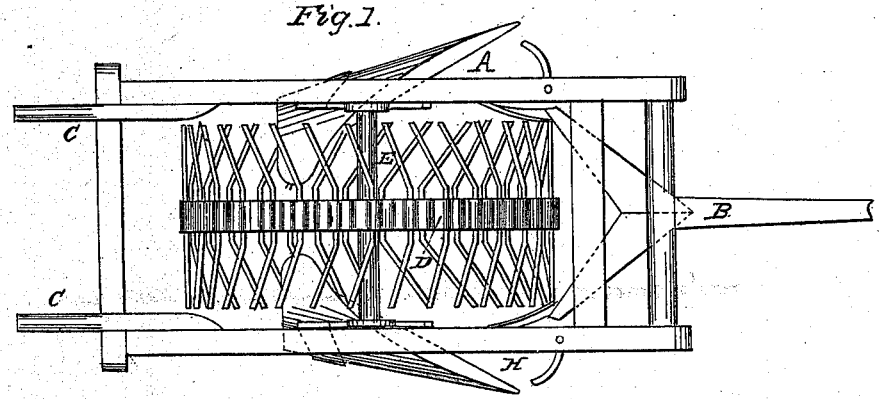
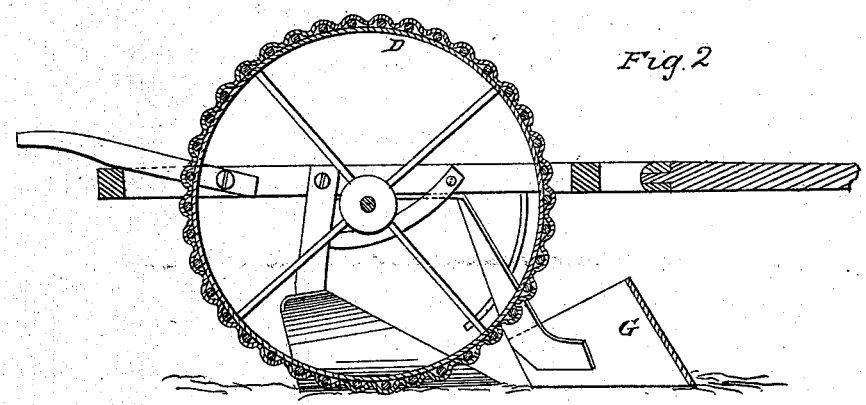

M. JOHNSON.
Potato Digger.

No. 103,194.

2 Sheets—Sheet 2.

Patented May 17, 1870.

UNITED STATES PATENT OFFICE.

MOSES JOHNSON, OF THREE RIVERS, MICHIGAN.

IMPROVEMENT IN POTATO-DIGGERS.

Specification forming part of Letters Patent No. 103,194, dated May 17, 1870.

*To all whom it may concern:*

Be it known that I, MOSES JOHNSON, of Three Rivers, in the county of St. Joseph and State of Michigan, have invented a new and valuable Improvement in Potato-Diggers; and I do hereby declare that the following is a full, clear, and exact description of the construction and operation of the same, reference being had to the annexed drawings, making a part of this specification, and to the letters and figures of reference marked thereon.

Figure 1 of the drawings is a top view of my invention. Fig. 2 is a central vertical longitudinal section thereof, and Fig. 3 is a rear view.

My invention relates to potato-diggers; and it consists in the construction of a rotating wheel with bent fingers on its periphery, together with novel means for separating a hill of potatoes and guiding the contents thereof upon such wheel, as hereinafter described.

A of the drawings represents a quadrangular frame, to the front end of which is attached the neap B, and to the rear end the handles C.

The letter D represents a wheel affixed to and rotating with the shaft E, which said shaft has its bearings in the sides of the frame A, as shown. Upon the periphery of wheel D, I arrange a series of bent bars, v, each of which bars is bent forward, as shown, in the line of the draft. Any method of adjusting these bent rods or bars to the rim of the wheel that will hold them securely in place may be adopted by the manufacturer; but I usually prefer to attach them by solder or keys in corrugations or loops y, as the drawings represent.

The letter G represents a plow or separator attached to the frame by supporting-bars on each side of the wheel, and so arranged that it shall be moved in front of the wheel with the frame and operate to part the hill of potatoes and guide the contents thereof outside the bent arms of the wheel to the right and left, respectively. I usually construct this separator of such height that a portion of the contents of the hill shall be allowed to pass over its top, and from thence be reached and manipulated by the wheel and its bars or teeth.

H represents plowshares of the form represented, one of which is attached to each of the side bars of the frame by suitable supporting bars and braces. The office of these shares is to receive and guide the contents of the potato-hill, after it is parted by the separator, to the bent bars or fingers of the wheel.

My machine operates as follows, namely: The operator guides the frame in such manner that the separator shall pass as nearly as possible through the center of the potato-hill and to the bottom thereof. The separator parts the hill, and both the potatoes and earth that forms it are passed outward and over the top thereof. All that portion of the contents of the potato-hill that passes over the top of the separator is operated upon by the wheel in its rear, while all that is passed outward is caught by the plowshares H and returned inward upon the bent bars or fingers of the wheel. It follows that by the action of the fingers v always retreating rearward the earth is separated from the potatoes, and the latter are scattered upon the surface of the soil.

I claim as my invention—

1. The wheel D, when constructed with bent fingers v, substantially as and for the purpose specified.

2. In combination with the wheel D, the separator G and plowshares H, when constructed and arranged substantially as described.

In testimony that I claim the above I have hereunto subscribed my name in the presence of two witnesses.

MOSES JOHNSON.

Witnesses:
   E. H. LOTHROP,
   D. D. TENNYSON.